US00RE48377E

(19) United States
(12) Reissued Patent
Goodwin et al.

(10) Patent Number: US RE48,377 E
(45) Date of Reissued Patent: Jan. 5, 2021

(54) PHOSPHORUS ZINC MANGANESE FERTILIZER

(71) Applicant: Compass Minerals Manitoba Inc., Winnipeg (CA)

(72) Inventors: Mark Goodwin, Kelowna (CA); Kerry Green, Winnipeg (CA)

(73) Assignee: Compass Minerais Manitoba Inc., Winnipeg (CA)

(21) Appl. No.: 16/399,213

(22) Filed: Apr. 30, 2019

Related U.S. Patent Documents

Reissue of:
(64) Patent No.: 9,187,380
Issued: Nov. 17, 2015
Appl. No.: 14/332,002
Filed: Jul. 15, 2014

U.S. Applications:
(60) Provisional application No. 61/947,722, filed on Mar. 4, 2014.

(51) Int. Cl.
*C05B 17/02* (2006.01)
*C05G 5/30* (2020.01)
*A01C 1/06* (2006.01)

(52) U.S. Cl.
CPC ..... *C05B 17/02* (2013.01); *A01C 1/06* (2013.01); *C05G 5/30* (2020.02)

(58) Field of Classification Search
CPC ..... C05B 17/02; C05G 5/30; A01C 1/06
See application file for complete search history.

(56) References Cited

U.S. PATENT DOCUMENTS 2,103,953 A * 12/1937 Northen ..... 71/53
2,823,107 A 2/1958 Allison
3,353,949 A 11/1967 Nau
3,423,199 A 1/1969 Philen, Jr. et al.
3,523,019 A 8/1970 Philen, Jr. et al.
3,640,698 A 2/1972 Backlund
3,938,469 A * 2/1976 Nau ..... 118/303
4,035,173 A * 7/1977 Hashimoto et al. ..... 71/30
4,124,405 A * 11/1978 Quienot ..... 106/697
4,259,317 A * 3/1981 Vesely et al. ..... 424/93.5
4,297,122 A * 10/1981 Wallace ..... 71/12
5,766,302 A * 6/1998 Lefroy et al. ..... 71/28
6,209,259 B1 * 4/2001 Madigan et al. ..... 47/57.6
6,309,440 B1 * 10/2001 Yamashita ..... 71/27
7,445,657 B2 * 11/2008 Green ..... 71/31
8,425,647 B1 * 4/2013 Brooke ..... 71/11
8,480,782 B2 * 7/2013 Wright et al. ..... 71/64.07
8,888,887 B2 * 11/2014 Hargrove et al. ..... 71/32
8,979,970 B2 * 3/2015 Kucera et al. ..... 71/33

(Continued)

FOREIGN PATENT DOCUMENTS

CA 2345952 8/1992
CA 2216735 10/1996

(Continued)

OTHER PUBLICATIONS

Office Action dated Dec. 3, 2019 in corresponding Brazilian Patent Application No. BR112016020496-4 (includes English translation of Office Action), 9 pages.

(Continued)

*Primary Examiner* — Jerry D Johnson
(74) *Attorney, Agent, or Firm* — Hovey Williams LLP

(57) ABSTRACT

A starter fertilizer product combining manganese with P and Zn creates a previously unknown synergy in early plant growth and plant health.

23 Claims, 2 Drawing Sheets

(56) References Cited

U.S. PATENT DOCUMENTS

| | | | | |
|---|---|---|---|---|
| 2002/0026659 | A1* | 2/2002 | Blowers et al. | 800/298 |
| 2003/0022790 | A1* | 1/2003 | Hero et al. | 504/100 |
| 2003/0110821 | A1* | 6/2003 | Peacock et al. | 71/33 |
| 2004/0152596 | A1* | 8/2004 | Peltonen et al. | 504/100 |
| 2006/0042338 | A1* | 3/2006 | Peacock | 71/33 |
| 2006/0243010 | A1* | 11/2006 | Sanders et al. | 71/28 |
| 2010/0170314 | A1* | 7/2010 | Goodwin | A01C 1/06 71/28 |
| 2010/0267554 | A1* | 10/2010 | Madsen et al. | 504/100 |
| 2011/0036009 | A1* | 2/2011 | Bissonnette et al. | 47/59 S |
| 2011/0214465 | A1* | 9/2011 | Peacock et al. | 71/28 |
| 2012/0073341 | A1* | 3/2012 | Goodwin | C05B 7/00 71/34 |
| 2012/0220454 | A1* | 8/2012 | Chen et al. | 504/100 |
| 2014/0274719 | A1* | 9/2014 | Davison | 504/297 |
| 2015/0027042 | A1* | 1/2015 | Goodwin | C05G 5/30 47/57.6 |

FOREIGN PATENT DOCUMENTS

| | | | |
|---|---|---|---|
| CA | 2476927 | | 9/2003 |
| CA | 2685097 | | 11/2008 |
| CA | 2751373 | | 8/2010 |
| CN | 1188754 | * | 7/1998 |
| CN | 1199724 | | 11/1998 |
| CN | 1985569 | | 6/2007 |
| CN | 101913935 | | 12/2010 |
| GB | 741378 | | 11/1955 |
| GB | 1094781 | | 12/1967 |
| GB | 1 558 579 | | 1/1980 |
| WO | 91/09818 | | 7/1991 |
| WO | 03/071855 | | 9/2003 |
| WO | 2007/132497 | | 11/2007 |
| WO | 2010/135814 | | 12/2010 |

OTHER PUBLICATIONS

Office Action dated Aug. 7, 2019 in corresponding Canadian Patent Application No. 2,941,390, 3 pages.

Extended European Search Report dated Oct. 11, 2017 in corresponding European Patent Application No. 14884553.0, 9 pages.

Office Action dated Nov. 30, 2018 in corresponding New Zealand Patent Application No. 724455, 7 pages.

Tonneson, "Wolf Trax Delivers New Way to Apply P," Farm Progress Aug. 14, 2013, 2 pages, https://www.farmprogress.com.

PCT/CA2014/050691, "Notification of Transmittal of the International Search Report and the Written Opinion of the International Searching Authority, or the Declaration," dated Nov. 12, 2014.

CN 101913935, Sun et al., Dec. 15, 2010, English Translation.

CN 1199724, Wang et al., Nov. 25, 1998, English Translation.

CN 1985569, Bin, Jun. 27, 2007, English Translation.

Office Action dated Apr. 22, 2015 in corresponding U.S. Appl. No. 14/332,002, filed Jul. 15, 2014, 13 pages.

Tonneson, "New products speed plant growth," Dakota Farmer Sep. 2013, p. 20, www.FarmProgress.com.

Wolftrax Innovation Showcase—2013, See videos at https://www.youtube.com/watch?v=sUWWjlqAQE0 and https://www.youtube.com/watch?v=mb23WOEr83c, published online Aug. 2013.

Green, K., Micronutrient Guide 2014, Top Crop Manager, Mar. 10, 2014, www.topcropmanager.com, 20 pages.

WolfTrax bright idea, See video at https://www.youtube.com/watch?v=_1bcGoLOuc0, online video Oct. 12, 2011.

WolfTrax Live, See video at https://www.youtube.com/watch?v=hq7V7bzpRR0, online video Feb. 18, 2013.

Helmy, A.M., "Impact of phosphorus fertilization and foliar application of trace elements on growth and yield of two wheat cultivars," Acta Agronomica Hungarica, vol. 61, No. 2, Jun. 2013, pp. 139-148 (abstract only attached).

Zhang et al., "The reduction in zinc concentration of wheat grain upon increased phosphorus-fertilization and its mitigation by foliar zinc application," Plant and Soil, vol. 361, Issue 1-2, Dec. 2012, pp. 143-152 (abstract only attached).

Shaygany et al., "Increased yield of direct seeded rice (Oryza sativa L.) by foliar fertilization through multi-component fertilizers," Archives of Agronomy and Soil Science, vol. 58, Issue 10, 2012, pp. 1091-1098 (abstract only attached).

Manchanda et al., "Chemical pools of zinc and their availability to wheat in a typic haplustept as influenced by phosphorus and manganese fertilization," Journal of the Indian Society of Soil Science, vol. 60, Issue 2, Jun. 2012, pp. 156-162 (abstract only attached).

PCT/CA2014/050691, "International Preliminary Report on Patentability," dated Sep. 6, 2016.

Nichols et al., "Phosphorus and Zinc Interactions and Their Relationships with Other Nutrients in Maize Grown in Chelator-Buffered Nutrient Solution," Journal of Plant Nutrition, vol. 35, Issue 1, 2012, pp. 123-141 (abstract only attached).

Tonneson, Lon, "Wolf Trax Delivers New Way to Apply P", 2 pages. Aug. 14, 2013.

Wolf Trax, Inc., PCT/CA2014/050691, "Notification of Transmittal of the International Search Report and the Written Opinion of the International Searching Authority, or Declaration" mailed Nov. 12, 2014.

* cited by examiner

PHOSPHORUS ZINC MANGANESE FERTILIZER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application claims priority under 35 U.S.C. § 119(e) to provisional applications U.S. Ser. No. 61/947,722, filed Mar. 4, 2014, herein incorporated by reference in its entirety.

FIELD OF THE INVENTION

The present invention relates generally to the field of fertilizers. More specifically, the present invention relates to a fertilizer product that provides the early season "starter" or "pop-up" benefits typically ascribed to phosphorus applications in situations where these traditional phosphorus applications are inappropriate because the soil already has adequate to excessive P. For example, growers are often forced to use traditional P applications when they already have high soil-P readings in order to get accelerated growth from the crop.

BACKGROUND OF THE INVENTION

Starter fertilizer is defined as the small quantity of fertilizer nutrients applied in close proximity to the seed at planting by growers of crops. In some instances, the practice entails placing the fertilizer into the seed row directly with the seed, which is often referred to as a pop-up fertilizer. Growers of crops use starter fertilizers to enhance the development of emerging seedlings by supplying essential nutrients in accessible locations near the roots. This is especially important when crops are planted into cold, wet soils, particularly when there is minimum tillage of soil.

Nowhere in the literature have scientists defined a critical ratio or noted a specific synergy between $P_2O_5$, (phosphate) Zn and Mn when these elements are applied in concert—particularly in finely divided particles. Work to date examines the three nutrients with respect to beneficial effects on plants pairwise or singly.

Phosphorus is immobile in the soil and consequently small seedling roots have difficulty obtaining the necessary amounts from the soil for rapid growth. For these reasons, additions of phosphorus fertilizer (often referred to as "starter fertilizer") are routinely used to enhance early phosphorus uptake by crop seedlings, which in turn enhances early seedling growth or "pop-up". This application strategy is often used even when overall phosphorus levels in a field may be adequate or high. Usually, recommendations call for 35 kg of $P_2O_5$ per hectare to accomplish this effect.

In certain situations, zinc may also be used as a component of a starter fertilizer. Like phosphorus, zinc is highly immobile in soil. In situations where soil tests indicate that zinc levels are inadequate or marginal, growers will use zinc as a component of a starter fertilizer as well.

Manganese is never commonly considered as a starter fertilizer and it is seldom used as a component of a starter fertilizer because among other reasons it is an immobile nutrient.

In no case does the literature refer to the benefits that would arise from using a combination of phosphorus/zinc/manganese as a coating on macronutrients, or as a starter fertilizer or pop-up fertilizer. Applicants have discovered a composition and method which mobilizes both zinc and manganese in the soil so that they can be used along with phosphorous in starter or pop up fertilizers. Such is accomplished by controlling the immediate environment around the composition including physical format, acidity conditions and composition.

Work at Brigham Young University in 2011 attempted to characterize the interaction between zinc and phosphorus fertilizer (but not manganese) and this work found that "when varying both P and Zn increasing Zn levels stimulated P uptake when ample P was present in the soil—but this did not occur when P was deficient. (Brandt, A, B Hopkins, V Jolley, B Webb, B greenwood and J Buck, 2012: "Phosphorus and zinc interactions and their relationships with other nutrients in maize grown in chelator buffered nutrient solution, J Plant Nutrition 35:1, 123-141).

SUMMARY OF THE INVENTION

According to an aspect of the invention, there is provided a fertilizer product comprising:

from about 1 part manganese;
from about 4 to about 6 parts phosphate; and
from about 2 to about 4 parts zinc.

According to yet another aspect of the invention, there is provided an agronomic product coated with a fertilizer product comprising:

from about 1 part manganese;
from about 4 to about 6 parts phosphate; and
from about 2 to about 4 parts zinc.

According to another aspect of the invention, there is provided a method of improving tolerance of a plant to root diseases comprising:

providing a plant, a seed or a seedling a fertilizer product comprising:
from about 1 part manganese;
from about 4 to about 6 parts phosphate; and
from about 2 to about 4 parts zinc; and
growing the plant, the seed or the seedling under suitable growth conditions.

According to a further aspect of the invention, there is provided a method of improving early growth of a plant comprising:

providing a plant, a seed or a seedling a fertilizer product comprising:
from about 1 part manganese;
from about 4 to about 6 parts phosphate; and
from about 2 to about 4 parts zinc; and
growing the plant, the seed or the seedling under suitable growth conditions.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

Figure 1:
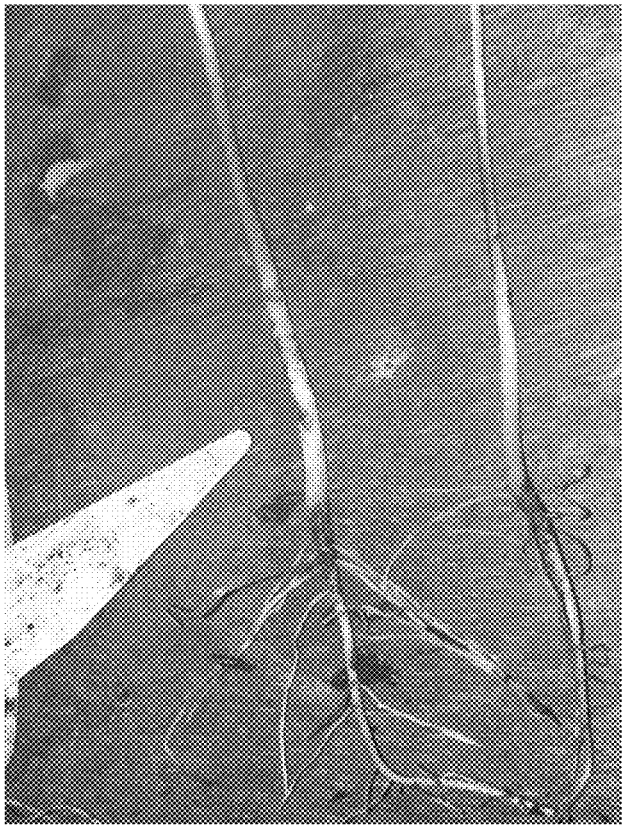
FIG. 1. Soybean seedling on the left side has root rot lesions but Mn DDP coating on NPK has allowed the seedling to outrun the disease. On the right side, the seedling is lesioned and the disease is stunting growth.

Research by the inventors has shown that manganese applied as a coating on NPK fertilizer aids in early season growth characteristics of crops by combatting root rot diseases that typically would slow down emergence (as shown in FIG. 1). Furthermore, combining manganese with P and Zn creates a heretofore unknown synergy in early plant growth and plant health.

That is, while not wishing to be bound to a particular theory or hypothesis, the inventor believes that phosphate can induce zinc deficiency and that supplying a plant with phosphate only would induce a zinc deficiency in that plant, thereby reducing growth rate and growth efficiency. Similarly, zinc can induce a phosphate deficiency. Furthermore, manganese can substitute for magnesium in chlorophyll molecules. Consequently, manganese, zinc and phosphate are all required during early stages of growth and accordingly, supplying all three in synergistic amounts promotes improves plant growth, as discussed herein.

This patent relates to the discovery of a heretofore unknown synergy between three key nutrients when they are applied using three specific provisos: (a) they must be applied together in a homogeneous mix, (b) they must be applied in a specific range of ratios and (c) they must be applied as powders coated upon conventional granular or prilled fertilizer or alternatively, onto seed. The specific nutrients and ratios in powdered form coated onto macro fertilizers are Zn, P and Mn. When we applied these nutrients in using the three constraints outlined, outsized gains in plant growth were achieved beyond what would be expected from a simple additive effect in meeting plant nutritional needs.

Furthermore, phosphate can induce zinc deficiency and that supplying a plant with phosphate only would induce a zinc deficiency in that plant, thereby reducing growth rate and growth efficiency. Similarly, zinc can induce a phosphate deficiency. Manganese can substitute for magnesium in chlorophyll molecules. Consequently, manganese, zinc and phosphate are all required during early stages of growth and accordingly, supplying all three in synergistic amounts promotes improved plant growth.

Thus, the combination of (a) a root growth stimulation achieved with the powdered P along with (b) a disease protection facet from the powdered Mn and (c) a synergy from including a small amount of powdered Zinc leads to a level of plant growth that only typically would be seen using tens of pounds of phosphate fertilizers.

According to an aspect of the invention, there is provided a fertilizer product comprising:

from about 1 part manganese;

from about 4 to about 6 parts phosphate; and from about 2 to about 4 parts zinc.

Preferably, the zinc, manganese and phosphate are of a particle size of at least through a 100 mesh, U.S. standard sieve. In other embodiments, they are of a particle size of at least through 325 mesh, U.S. standard sieve. In yet other embodiments, they are of a size between 100 to 325 mesh.

In a preferred embodiment, the components of the fertilizer product are mixed together in a dry mill grinder, and ground to a fine mesh size of at least through a 100 mesh or at least through a 325 mesh and then applied directly to a dry agronomic product. It is of note that the dry powder is applied directly to the agronomic product without the use of a binder solution or adhesive solution.

In another aspect of the invention, the fertilizer product having a particle size of at least through about 100 mesh, at least through about 300 mesh or between 100-325 mesh is applied directly to a suitable agronomic product. That is, the powder adheres directly to the outer surface of the agronomic product, without use of a binder or adhesive.

In some embodiments, the fertilizer product in the form of a fine powder mixture is applied at from about 0.1% to about 2.5% (w/w) of the agronomic product. In alternative embodiments, the powder mixture is applied at from about 0.1% to about 2.0% or from about 0.1% to about 1.5% or from about 0.3% to about 2.5% or from about 0.3% to about 2.0% or from about 0.3% to about 1.5% (w/w) of the agronomic product.

The agronomic product may be any suitable coat-able agricultural agent, that is, anything applied to the soil, for example, an inert carrier, a biodegradable carrier, a fertilizer product, a fertilizer prill, a fertilizer granule, a soil amending product, or a seed.

As will be appreciated by one of skill in the art, any agriculturally acceptable form of zinc, manganese and/or phosphate may be used within the invention.

For example, the phosphate source may be for example but by no means limited to monoammonium phosphate, diammonium phosphate, rock phosphate and mixtures thereof. Monoammonium phosphate may be low pH monoammonium phosphate with for example a pH of 4-5.9.

The manganese source may be for example but by no means limited to manganese sulphate, manganese chloride, manganese nitrate, manganese oxide and mixtures thereof.

The zinc source may be for example but by no means limited to zinc sulphate, zinc chloride, zinc oxide, zinc nitrate and mixtures thereof.

According to an aspect of the invention, there is provided a fertilizer product comprising:

from about 1 part manganese sulphate, manganese chloride, manganese nitrate, manganese oxide or mixtures thereof.

from about 4 to about 6 parts monoammonium phosphate, diammonium phosphate, rock phosphate or mixtures thereof; and from about 2 to about 4 parts zinc sulphate, zinc chloride, zinc oxide, zinc nitrate or mixtures thereof.

Preferably, the zinc, manganese and phosphate are of a particle size of at least 100 mesh. In other embodiments, they are of a particle size of at least 325 mesh. In yet other embodiments, they are of a size between 100 to 325 mesh.

In a preferred embodiment, the components of the fertilizer product are mixed together in a dry mill grinder, and ground to a fine mesh size of at least 100 mesh or at least 325 mesh and then applied directly to a dry agronomic product. It is of note that the dry powder is applied directly to the agronomic product without the use of a binder solution or adhesive solution.

As will be readily apparent to one of skill in the art, the various chemical forms of magnesium, zinc and phosphate have different uptake rates and consequently by varying the ratios of the different minerals in the fertilizer product, the amount of the specific mineral available to the plants at specific times following seeding can be varied.

In another aspect of the invention, there is provided a method of improving tolerance of a plant to root diseases comprising:

providing a plant, seed or seedling a fertilizer product comprising:

from about 1 part manganese;

from about 4 to about 6 parts phosphate; and from about 2 to about 4 parts zinc; and growing the plant under suitable growth conditions.

As discussed in the examples, a plant provided the starter fertilizer will show improved growth compared to a plant of similar type and age, grown under similar conditions except for the presence of the starter fertilizer. For example, the treated plant may have at least a more extensive root structure, greater disease tolerance, greater growth rate and greater plant weight compared to the untreated control plant.

Preferably, the plant or seedling is planted in soil and the soil is supplied with the fertilizer product.

More preferably, the fertilizer product is coated onto a suitable agronomic product.

In yet other embodiments, the fertilizer product may be coated onto a seed which is then planted into the soil.

In some embodiments, the fertilizer product in the form of a fine powder mixture is applied at from about 0.1% to about 2.5% (w/w) of the agronomic product. In alternative embodiments, the powder mixture is applied at from about 0.1% to about 2.0% or from about 0.1% to about 1.5% or from about 0.3% to about 2.5% or from about 0.3% to about 2.0% or from about 0.3% to about 1.5% (w/w) of the agronomic product.

The agronomic product may be any suitable coat-able agricultural agent, that is, anything applied to the soil, for example, an inert carrier, a biodegradable carrier, a fertilizer product, a fertilizer prill, a fertilizer granule, a soil amending product, or a seed.

As will be appreciated by one of skill in the art, any of various plant diseases characterized by decay of the roots and caused especially by fungi can be designated as a root disease or as root rot.

In another aspect of the invention, there is provided a method of improving early growth of a plant comprising:

providing a plant, seed or seedling a fertilizer product comprising:

from about 1 part manganese;

from about 4 to about 6 parts phosphate; and from about 2 to about 4 parts zinc; and growing the plant under suitable growth conditions.

As discussed in the examples, a plant provided the fertilizer product will show improved growth compared to a plant of similar type and age, grown under similar conditions except for the presence of the starter fertilizer. For example, the treated plant may have at least a more extensive root structure, greater disease tolerance, greater growth rate and greater plant weight compared to the untreated control plant.

The plant or seedling may be provided the fertilizer product by being grown from a seed coated with the fertilizer product.

In some embodiments, the fertilizer product is applied at from about 0.1% to about 2.0% or from about 0.1% to about 1.5% or from about 0.3% to about 2.5% or from about 0.3% to about 2.0% or from about 0.3% to about 1.5% (w/w) of an agronomic product which is planted in the soil either prior to, after or simultaneously with planting of the plant, seed or seedling.

That is, the fertilizer product or coated agronomic product may be co-administered to the soil with planting of the seed or seedling and that while these may be stated as separate steps herein for ease of comprehension, co-administration is within the scope of the invention. Alternatively, the agronomic product may be a seed coated with the fertilizer product which is planted. As will be appreciated by one of skill in the art, in this case, the seed and the fertilizer product are of course co-administered.

EXAMPLES

The invention will now be described by way of examples; however, the invention is not necessarily limited by the examples.

The literature, in general, states that adequate nutrition allows plants to maintain their growth rate in spite of disease but the role of micronutrients in maintaining growth rate in the face of disease has not been well-researched. For example, there is some suggestion or evidence that Mn nutrition may aid in plant disease tolerance. This evidence is based on an apparent inverse correlation between Mn concentration in the plant and disease severity. Other work seems to point to crop plants benefiting to a greater degree from applications of zinc than do bacteria or other pathogens.

Specifically, in the experiment shown in FIG. 1, seedlings were grown in cold conditions (overnight in a refrigeration unit) in order to ensure adequate disease incidence for evaluation. At 21 days after emergence, the seedlings were uprooted and assessed as to incidence of root rot lesions. They were then weighed.

In FIG. 1, the soybean seedling on the left side has root rot lesions but Mn coating on an NPK prill has allowed the seedling to "outrun" the disease. On the right side, the seedling is lesioned and the disease is stunting growth. This is shown by the less extensive root structure found in the seedling on the right panel. That is, as will be appreciated by one of skill in the art, the fertilizer composition described herein did not control or eliminate root rot but rather allowed the seedlings to thrive despite the presence of the disease.

Figure 2:
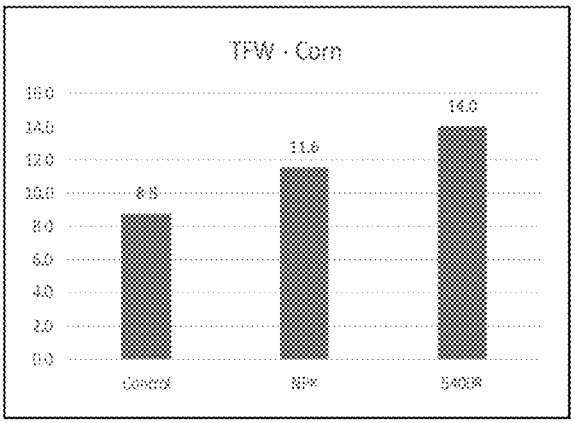
FIG. 2 shows the impact on early growth on crops when the three elements are applied in a fashion wherein they are of a particle size as described above and applied as a coating onto urea and K prills/granules and compares this to the early plant health achieved with phosphate at a standard 35 kg per ha rate. Note total fresh weights are better for seedlings at this optimized ratio.
Figure 2:
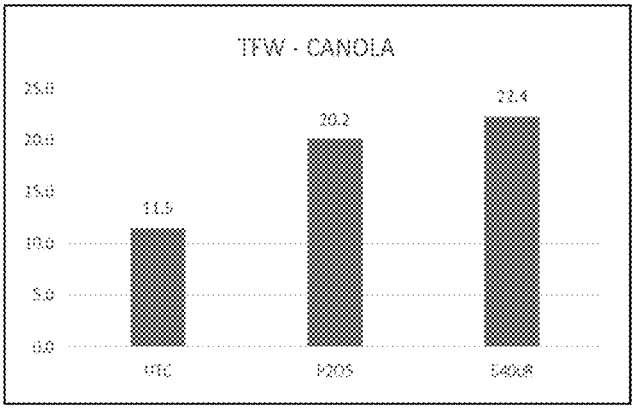
Figure 2:
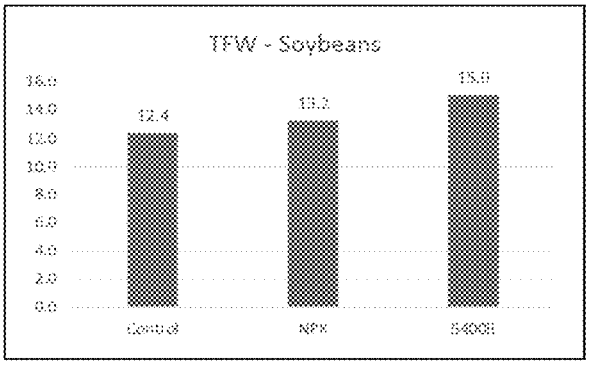

FIG. 2 describes an experiment that shows the impact on early growth on four crops when the three elements are applied in a fashion wherein they are of a particle size between 100 and 325 mesh and applied as a coating onto urea and K prills/granules and compares this to the early plant health achieved with phosphate at a standard 35 kg per ha rate. Note total fresh weights are better for seedlings at this optimized ratio.

Specifically, corn grown from the untreated control seeds had a total fresh weight of 8.8 grams, while corn provided a standard "NPK" fertilizer had a total fresh weight of 11.6 g. However, supplying the corn seeds with the NPK fertilizer product coated with the fertilizer product of the invention produced corn plants having a total fresh weight of 14.0 g.

Similarly, canola grown in control soil had a total fresh weight of 11.5 g. Canola supplied a standard phosphate fertilizer product had a total fresh weight of 20.2. Canola supplied the phosphate fertilizer product coated with the fertilizer product of the invention had a total fresh weight of 22.4 g.

Soybeans grown in control soil had a total fresh weight of 12.4 g. Soybeans supplied an NPK fertilizer had a total fresh weight of 13.2 g. Soybeans supplied the NPK fertilizer coated with the fertilizer powder of the invention had a total fresh weight of 15.0 g.

While the preferred embodiments of the invention have been described above, it will be recognized and understood that various modifications may be made therein, and the appended claims are intended to cover all such modifications which may fall within the spirit and scope of the invention.

What is claimed:

1. An agronomic product coated with a fertilizer product, the fertilizer product comprising *a dry mixture of*:

about 1 part manganese;

[to] *from* about 4 to about 6 parts phosphate; and from about 2 to about 4 parts zinc,

*wherein each of said manganese, phosphate, and zinc has a particle size of from 100 to 325 mesh, U.S. Standard screen*.

[2. The coated agronomic product according to claim 1 wherein the zinc, the manganese and the phosphate are of a particle size of at least through a 100 mesh, U.S. Standard screen.]

[3. The coated agronomic product according to claim 1 wherein the zinc, the manganese and the phosphate are of a particle, size of at least through 325 mesh, U.S. Standard screen.]

[4. The coated agronomic product according to claim 1 wherein the zinc, the manganese and the phosphate are of a particle size between 100 to 325 mesh, U.S. Standard screen.]

5. The coated agronomic product according to claim 1 wherein the phosphate source is selected from the group consisting of monoammonium phosphate, diammonium phosphate, rock phosphate and mixtures thereof.

6. The coated agronomic product according to claim 1 wherein the manganese is selected from the group consisting of manganese sulphate, manganese chloride, manganese nitrate, manganese oxide and mixtures thereof.

7. The coated agronomic product according to claim 1 wherein the zinc is selected from the group consisting of zinc sulphate, zinc chloride, zinc oxide, zinc nitrate and mixtures thereof.

8. The coated agronomic product according to claim 1 wherein the fertilizer product is applied to the agronomic product at from about 0.1% to about 2.5% (w/w) of the agronomic product.

9. The coated agronomic product according to claim 1 wherein the fertilizer product is applied to the agronomic product at from about 0.1% to about 2.0% (w/w) of the agronomic product.

10. The coated agronomic product according to claim 1 wherein the fertilizer product is applied to the agronomic product at from about 0.1% to about 1.5% (w/w) of the agronomic product.

11. The coated agronomic product according to claim 1 wherein the fertilizer product is applied to the agronomic product at from about 0.3% to about 2.5% (w/w) of the agronomic product.

12. The coated agronomic product according to claim 1 wherein the fertilizer product is applied to the agronomic product at from about 0.3% to about 2.0% (w/w) of the agronomic product.

13. The coated agronomic product according to claim 1 wherein the fertilizer product is applied to the agronomic product at from about 0.3% to about 1.5% (w/w) of the agronomic product.

14. The coated agronomic product according to claim 1 wherein the agronomic product is selected from the group consisting of an inert carrier, a biodegradable carrier, a fertilizer product, a fertilizer prill, a fertilizer granule, a soil amending product and a seed.

[15. A method of improving tolerance of a plant to root diseases comprising:

providing a plant, a seed or a seedling a fertilizer product comprising:

from about 1 part manganese;

from about 4 to about 6 parts phosphate; and from about 2 to about 4 parts zinc;

wherein the fertilizer product is provided to the plant, the seed or the seedlings an agronomic product coated with the fertilizer product; and growing the plant, the seed or the seedling under suitable growth conditions.]

[16. The method according to claim 15, Wherein the zinc, manganese and phosphate are of a particle size of at least through a 100 mesh.]

[17. The method according to claim 15 wherein the zinc, manganese and phosphate are of a particle size of at least through a 325 mesh.]

[18. The method according to claim 15 wherein the zinc, manganese and phosphate are of a particle size between 100 to 325 mesh.]

[19. The method according to claim 15 wherein the phosphate is selected from the group consisting of monoammonium phosphate, diammonium phosphate, rock phosphate and mixtures thereof.]

[20. The method according to claim 15 wherein the manganese is selected from the group consisting of manganese sulphate, manganese chloride, manganese nitrate, manganese oxide and mixtures thereof.]

[21. The method according to claim 15 wherein the zinc is selected from the group consisting of zinc sulphate, zinc chloride, zinc oxide, zinc nitrate and mixtures thereof.]

[22. The method according to claim 15 wherein the fertilizer product is applied to the agronomic product at from about 0.1% to about 2.5% (w/w) of the agronomic product.]

[23. The method according to claim 15 wherein the fertilizer product is applied to the agronomic product at from about 0.1% to about 2.0% (w/w) of the agronomic product.]

[24. The method according to claim 15 wherein the fertilizer product is applied to the agronomic product at from about 0.1% to about 1.5% (w/w) of the agronomic product.]

[25. The method according to claim 15 wherein the fertilizer product is applied to the agronomic product at from about 0.3 to about 2.5% (w/w) of the agronomic product.]

[26. The method according to claim 15 wherein the fertilizer product is applied to the agronomic product at from about 0.3% to about 2.0% (w/w) of the agronomic product.]

[27. The method according to claim 15 wherein the fertilizer product is applied to the agronomic product at from about 0.3% to about 1.5% w/w) of the agronomic product.]

[28. The method according to claim 15 wherein the agronomic product is selected from the group consisting of an inert carrier, a biodegradable carrier, a fertilizer product, a fertilizer prill, a fertilizer granule, a soil amending product and a seed.]

29. A method of improving early growth of a plant comprising:

providing *to* a plant, a seed, or a seedling a fertilizer product comprising *a dry mixture of*:

[from] about 1 part manganese;

from about 4 to about 6 parts phosphate; and from about 2 to about 4 parts zinc,

*wherein each of said manganese, phosphate, and zinc has a particle size of from 100 to 325 mesh, U.S. Standard screen*;

wherein the fertilizer product is provided to the plant, the seed, or the seedling as an agronomic product coated with the fertilizer product; and growing the plant, the seed or the seedling under suitable growth conditions.

[30. The method according to claim 29 wherein the zinc, manganese and phosphate are of a particle size of at least through a 100 mesh.]

[31. The method according to claim 29 wherein the zinc, manganese and phosphate are of a particle size of at least through a 325 mesh.]

[32. The method according to claim 29 wherein the zinc, manganese and phosphate are of a particle size between 100 to 325 mesh.]

33. The method according to claim 29 wherein the phosphate source is selected from the group consisting of monoammonium phosphate, diammonium phosphate, rock phosphate and mixtures thereof.

34. The method according to claim 29 wherein the manganese source is selected from the group consisting of manganese sulphate, manganese chloride, manganese nitrate, manganese oxide and mixtures thereof.

35. The method according to claim 29 wherein the zinc source is selected from the group consisting of zinc sulphate, zinc chloride, zinc oxide, zinc nitrate and mixtures thereof.

36. The method according to claim 29 wherein the fertilizer product is applied to the agronomic product at from about 0.1% to about 2.5% (w/w) of the agronomic product.

37. The method according to claim 29 wherein the fertilizer product is applied to the agronomic product at from about 0.1% to about 2.0% (w/w) of the agronomic product.

38. The method according to claim 29 wherein the fertilizer product is applied to the agronomic product at from about 0.1% to about 1.5% (w/w) of the agronomic product.

39. The method according to claim 29 wherein the fertilizer product is applied to the agronomic product at from about 0.3% to about 2.5% (w/w) of the agronomic product.

40. The method according to claim 29 wherein the fertilizer product is applied to the agronomic product at from about 0.3% to about 2.0% (w/w) of the agronomic product.

41. The method according to claim 29 wherein the fertilizer product is applied to the agronomic product at from about 0.3% to about 1.5% (w/w) of the agronomic product.

42. The method according to claim 29 wherein the agronomic product is selected from the group consisting of an inert carrier, a biodegradable carrier, a fertilizer product, a fertilizer prill, a fertilizer granule, a soil amending product and a seed.

*43. The method according to claim 29, wherein early growth is improved by increasing tolerance to root diseases.*

* * * * *